United States Patent
Robb et al.

(10) Patent No.: US 7,047,911 B2
(45) Date of Patent: May 23, 2006

(54) HYDRAULIC FAN DRIVE SYSTEM EMPLOYING BINARY CONTROL STRATEGY

(75) Inventors: Neil E. Robb, Jackson, MI (US); James E. Ignatovich, Ceresco, MI (US); Dale M. Pickelman, Marshall, MI (US); Theodore A. Malott, Jackson, MI (US); Gary E. Hart, Indianapolis, IN (US)

(73) Assignee: BorgWarner Inc., Auburn Hills, MI (US)

( * ) Notice: Subject to any disclaimer, the term of this patent is extended or adjusted under 35 U.S.C. 154(b) by 355 days.

(21) Appl. No.: 10/604,929

(22) Filed: Aug. 27, 2003

(65) Prior Publication Data

US 2005/0047567 A1    Mar. 3, 2005

(51) Int. Cl.
*F01P 7/02* (2006.01)

(52) U.S. Cl. ............... 123/41.12; 192/85 AA

(58) Field of Classification Search ............. 379/93.32, 379/93.31, 90.01, 88.25, 88.2, 88.23, 257, 379/377, 220.01, 207.02, 212.01, 229, 198; 123/41.12; 192/52.4, 85 AA, 103 F, 105 F See application file for complete search history.

(56) References Cited

U.S. PATENT DOCUMENTS

| | | | |
|---|---|---|---|
| 2,609,054 A | 9/1952 | Geyer et al. | |
| 2,960,202 A | 11/1960 | Stevens et al. | |
| 4,231,457 A | 11/1980 | Cornish | |
| 4,467,901 A | 8/1984 | Hattori et al. | |
| 4,899,861 A | 2/1990 | Cummings, III | |
| 5,224,446 A | 7/1993 | Okita et al. | |
| 5,667,045 A | 9/1997 | Cummings, III | |
| 5,855,266 A | 1/1999 | Cummings, III | |
| 5,937,979 A | 8/1999 | Cummings | |
| 5,947,247 A | 9/1999 | Cummings, III | |
| 2003/0041814 A1 | 3/2003 | Laird et al. | |

FOREIGN PATENT DOCUMENTS

GB                622 619 A     6/1940

*Primary Examiner*—Noah P. Kamen
(74) *Attorney, Agent, or Firm*—Artz & Artz, P.C.; Greg Dziegielewski

(57) ABSTRACT

A hydraulically controlled fan drive system for controlling the cooling of an engine and having a method of engagement includes a housing assembly containing a hydraulic fluid and an engaging circuit. The engaging circuit includes a pitot tube coupled within the housing assembly that receives at least a portion of the hydraulic fluid as the housing assembly rotates to drive a clutch pack (and coupled fan) via static pressure. A fluid controller having binary control adjusts the static pressure within the pitot tube at a given rotational speed, thereby controlling the engagement of the clutch pack to a fully engaged drive (utilizing friction type engagement), a fully disengaged drive, and at least two partially engaged clutch positions (i.e. partially engaged utilizing a wet viscous type clutch engagement). To control static pressure release, the fluid controller may utilize a dual spool system valving arrangement or a parallel fixed orifice binary control.

22 Claims, 5 Drawing Sheets

HYDRAULIC FAN DRIVE SYSTEM EMPLOYING BINARY CONTROL STRATEGY

CROSS REFERENCE TO RELATED APPLICATIONS

The present invention is related to U.S. patent application Ser. No. 10/624,070 filed on Jul. 21, 2003 entitled "Hydraulic Controlled Fan Clutch with Integral Cooling", which is incorporated by reference herein.

BACKGROUND OF INVENTION

The invention relates generally to fan drive systems and more specifically to a hydraulic fan drive system employing binary control strategy.

The present invention relates to friction coupling devices and fluid coupling devices, such as friction clutch assemblies and viscous drives, the fluid coupling devices being of the type that include both a fluid operating chamber and a fluid reservoir chamber, and valving to control the quantity of fluid in the operating chamber.

Although the present invention may be used advantageously in various configurations and applications, it is especially advantageous in a coupling device used to drive a radiator cooling fan of an internal combustion engine for an over-the-road truck, such as a class 8 truck, and will be described in connection therewith.

Friction coupling devices and fluid coupling devices that drive radiator-cooling fans generally comprise dry friction clutch assemblies and viscous drive clutch assemblies, respectively.

Dry friction clutch assemblies tend to have tow operating conditions "ON and OFF" referring to when a friction clutch is either fully engaged or fully disengaged. When a friction clutch assembly is providing cooling, the clutch is fully engaged and not slipping. When the friction clutch assembly is not providing cooling, the assembly is fully disengaged and slip speed is at a maximum between a clutch plate and an engagement surface.

The dry friction clutch assemblies generally have low thermal capacity, since they typically do not incorporate fluid flow cooling mechanisms. Thus, the clutch assemblies have minimal cooling capability and are unable to cycle repeat in short durations of time. Also, because of low thermal capacity, the clutch assemblies are also limited in torsional capacity, such that they are incapable of engaging at high engine revolutions per minute (rpm) or high engine speeds. The thermal energy that is generated during engagement at high engine rpm speeds can "burn up" or cause the clutch assembly to become inoperative.

Viscous drive clutch assemblies, on the other hand, have become popular due to their ability to cycle repeat, engage at higher engine speeds, and have varying degrees of engagement. Viscous drives have an operating range of engagement, are generally less engaged at higher engine speeds and are generally more engaged at lower engine speeds. Viscous drives are never fully engaged for internal viscous shear purposes.

Unfortunately, viscous drive clutch assemblies are also thermally and torsionally limited. Viscous drives slip to some degree at all times making them to be incapable of turning at fully engaged peak operating speeds or at higher speeds than originally designed. Since viscous drives are continuously slipping, they are continuously generating heat, unlike friction clutch assemblies. Viscous drives are further limited in that the more engine cooling that is needed, the larger and more costly the viscous drive and cooling fan that are required. Thus, for increased engine cooling requirements, viscous drive clutch assemblies can become impractical in size and cost.

Due to increased engine cooling requirements, a current desire exists for a fan drive system that is capable of not only providing an increased amount of cooling over traditional fan drive systems, but also that it have the associated advantages of a friction clutch assembly as well as viscous drive clutch assemblies, without the associated disadvantages. It is also desirable that the fan drive system be practical and reasonable in size and cost, so as to be approximately similar to and preferably not to exceed that of traditional fan drive systems.

To address these issues, a new system and method for engaging a fan drive was developed. This system, which is described in U.S. patent application Ser. No. 10/624,070 filed Jul. 21, 2003 entitled "Hydraulic Controlled Fan Clutch with Intergral Cooling", to Robb et al, which is herein incorporated by reference, discloses a hydraulically controlled fan drive system having a certain method of engagement. The hydraulically controlled system includes a housing assembly containing a hydraulic fluid and an engaging circuit. The engaging circuit includes a pitot tube coupled within the housing assembly that receives at least a portion of the hydraulic fluid. An engaging circuit engages the housing assembly to a fan shaft in response to supply of the hydraulic fluid from the pitot tube.

One of several advantages of the above-stated clutch mechanism is that it converts fluid velocity into pressure through use of the pitot tube to generate normal force for engagement purposes. In so doing, the clutch mechanism provides variable engagement via internal hydraulic pressure control. The pitot tube provides an inexpensive pressure supply source that requires minimum space within the fan drive system. To disengage the friction clutch, a fluid controller adjusts the static pressure received by the piston by controlling fluid flow through a controller branch across the main center channel, via the return channel, whereafter the fluid returns to the reservoir. The fluid controller acts essentially as an ON/OFF mechanism to relieve or not relieve the static pressure, thereby either engaging or disengaging the clutch mechanism. The clutch mechanism does not provide a mid-range static pressure level within the pitot tube that can be used to create a partially engaged clutch output based on a viscous fluid type clutching mechanism, thereby allowing more precise control of cooling capabilities within the cooling system.

It is thus highly desirable to create a robust fan drive system that can be used in a wide variety fan clutch applications that is capable of controlling static pressures within the pitot tubes at any given pulley speed and pulley ratio to create mid level speed control.

SUMMARY OF INVENTION

The present invention provides a robust fan drive system that can be used in a wide variety fan clutch applications and is capable of controlling the static pressures within the pitot tubes used to engage, partially engage, or disengage the clutch mechanism at any given pulley speed and pulley ratio. The invention thus creates a so-called mid level speed control. The present invention provides two or more ON/OFF actuation devices coordinated in series to obtain as many flow rate/pressure combinations as desired.

In one preferred embodiment, a pair of sliding spools, one inside of the other, are used an the actuation devices. Each spool is coupled to a spring and magnetic coil setup that utilizes an ON/OFF actuation mechanism. The outer spool also has an inner and outer proportionating valve. When both coils are in the OFF position, each of the spools is biased such that a body region of the inner spool prevents the flow of fluid from the pitot tube to a fluid reservoir through the proportionating valve, therein providing maximum pressure to the piston to engage the fan via a friction-type clutch mechanism.

When both coils are in the ON position, the spools are biased to allow free flow of fluid (i.e. static pressure) from the pitot tube through the outer proportionating valve and back to the reservoir. This relieved static pressure allows a coupled piston is returned to an unbiased position such that the clutch mechanism (friction or viscous type) is not engaged.

When the outer coil is in the ON position and the inner coil is in the OFF position, a restricted flow of fluid from the pitot tube through the outer proportionating valve to the reservoir is achieved. The piston is partially unbiased from a fully engaged clutch position, defined wherein clutch plates are disengaged but in close proximity to one another. This allows clutch engagement via a viscous type drive mechanism, thereby achieving a mid-level, or intermediate, output speed.

When the outer coil is in the OFF position and the inner coil is in the ON position, a restricted flow of fluid from the pitot tube through the inner proportionating valve to the reservoir is achieved. The amount of flow, compared to the ON/OFF positioning described in the preceding paragraph, may be less or more, depending upon the gap created between the inner and outer spools located at a position wherein fluid flows through the proportionating valve. The piston is partially unbiased from a fully engaged clutch position, defined wherein clutch plates are disengaged but in close proximity to one another. This allows clutch engagement via a viscous type drive mechanism, thereby achieving a second mid-level, or intermediate, output speed.

In another preferred embodiment, the so-called parallel fixed orifice binary control, the supply flow is broken up into two or more separate channels, or orifices having a different orifice diameter. An electronically controlled valve is coupled within each of the orifices that can close the flow of fluid from the pitot tube to the reservoir when activated or allow the flow when deactivated. As above, friction type engagement of the clutch mechanism is achieved by closing both valves, thereby maintaining maximum static pressure within the pitot tube at a given pulley rotational speed and pulley ratio. By opening both valves, maximum static pressure relief is achieved, therein disengaging the clutch mechanism. By opening one of the two valve, partial pressure relief is achieved, therein allowing midspeed control at a given input rotational speed and pulley ratio. To further differentiate the flow through each channel, a different size restrictor may be placed within the orifice.

The present invention itself, together with attendant advantages, will be best understood by reference to the following detailed description, taken in conjunction with the accompanying figures.

DETAILED DESCRIPTION

Figure 1:
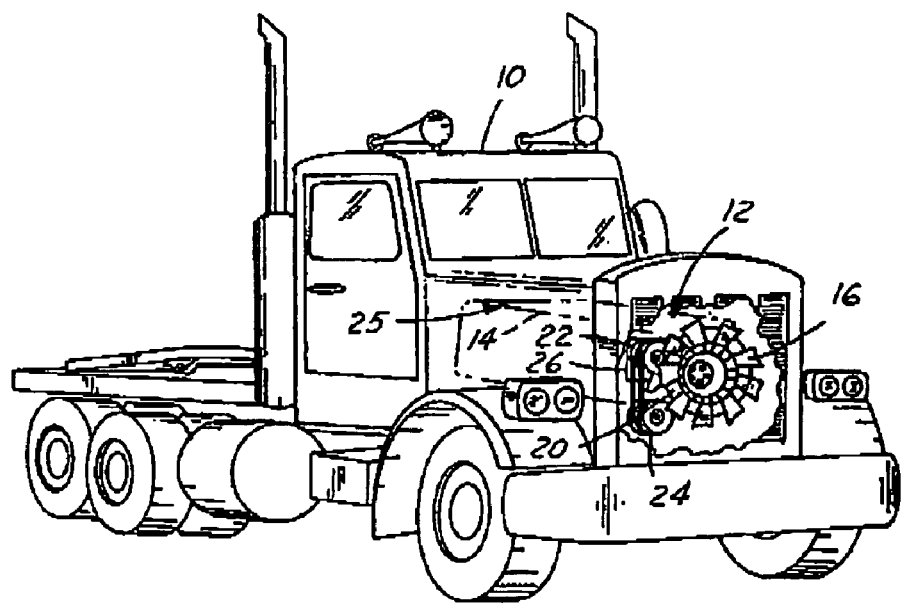
FIG. 1 is a perspective view of a vehicle utilizing a hydraulically controlled fan drive system in accordance with an embodiment of the present invention.

In the following figures the same reference numerals will be used to refer to the same components. While the present invention is described with respect to a method and system for a hydraulically controlled fan drive system, the present invention may be adapted and applied to various systems including: vehicle systems, cooling systems, fan drive system, friction drive systems, or other systems.

In the following description, various operating parameters and components are described for one constructed embodiment. These specific parameters and components are included as examples and are not meant to be limiting.

Also, in the following description various fan drive components and assemblies are described as an illustrative example. The fan drive components and assemblies may be modified depending upon the application.

Referring now to FIG. 1, a perspective view of a vehicle 10 utilizing a hydraulically controlled fan drive system 12 in accordance with an embodiment of the present invention is shown. The system 12 uses rotational energy from a liquid cooled engine 14 at an increased ratio to turn a radiator-cooling fan 16 to provide airflow through a radiator 18. The system 12 includes a housing assembly 20 fixed to a pulley 22, which is coupled to and rotates relative to a crankshaft (not shown) of the engine 14, via a pair of belts 24, within an engine compartment 25. Of course, the present invention may be relatively operative in relation to various components and via any number of belts or other coupling devices, such as a timing chain. The housing assembly 20 is mounted on the engine 14 via a mounting bracket 26. The housing assembly 20 hydraulically engages the fan 16 during desired cooling intervals to reduce temperature of the engine 14 or to perform other tasks further discussed below.

The fan 16 may be attached to the housing assembly 20 by any suitable means, such as is generally well known in the art. It should be understood, however, that the use of the present invention is not limited to any particular configuration of the system 12, or fan mounting arrangement, or any particular application for the system 12, except as is specifically noted hereinafter.

Referring now to FIGS. 2 and 3–6, a first portion and a second portion of a cross-sectional view of the system 12 in accordance with one preferred embodiment of the present invention are shown in the fully engaged clutch position. The system 12 includes an input circuit 30, the housing assembly 20, a piston assembly 34, an engaging circuit 36 having a mechanical portion 38 and an electrical portion 40, and a variable cooling and lubrication circuit 42. The input circuit 30 provides rotational energy to the housing assembly 20. The engaging circuit 36 engages the housing assembly 20 to a fan shaft 44, via the piston assembly 34, to rotate the fan 16. The fan 16 may be coupled to the fan shaft 44 via splines 46, which is threaded into the fan shaft 44, or by other techniques known in the art, such as being coupled to the fan hub 47. The fan shaft 44 may be a single unit, as shown, or may be split into a fan shaft portion and a clutch shaft portion. The variable cooling circuit 42 provides distribution of hydraulic fluid 48 throughout and in turn cooling and lubricating components within the housing assembly 20. The hydraulic fluid 48 may be an oil-based fluid or similar fluid known in the art.

The input circuit 30 includes the pulley 22 that rotates about the mounting bracket 26 on a set of pulley bearings 50. The pulley bearings 50 are held between pulley bearing notches 52, in a stepped inner channel 54 of the pulley 22, and pulley bearing retaining rings 56, that expand into pulley ring slots 58 in an interior wall 60 of the pulley 22. The pulley 22 may be of various type and style, as known in the art. The inner channel 54 corresponds with a first center opening 62 in the housing assembly 20. The hydraulic fluid 48 flows through the center opening 62 into the inner channel 54 and cools and lubricates the bearings 50. A first seal 64 resides in the inner channel 54 on an engine side 66 of the pulley 22 for retaining the hydraulic fluid 48 within the housing assembly 20.

The housing assembly 20 includes a die cast body member 70, and a die cast cover member 72, that may be secured together by bolts (not shown) through channels 73 of the outer periphery 74 of the die cast member 70 and cover member 72. The die cast member 70 and the cover member 72 may be secured together using outer methods known in the art. It should be understood that the present invention is not limited to use with a cast cover member, but may also be used with other members such as a stamped cover member. The housing assembly 20 is fastened to the pulley 22, via fasteners (not shown) extending through the cover member 20 into the pulley 22 in designated fastener holes 76. The housing assembly 20 rotates in direct relation with the pulley 22 and rides on housing bearings 78 that exists between the housing assembly 20 and the fan shaft 44. The housing bearing 78 is held within the housing assembly 20 between a corresponding housing bearing notch 80 in the body member 70 and a housing bearing retainer ring 82 that expands into a housing ring slot 84. A second center opening 86 exists in the body member 70 to allow the hydraulic fluid 48 to also circulate, cool, and lubricate the housing bearings 78. A second seal 88 resides on a fan side 90 of the housing assembly 20 for retaining the hydraulic fluid 48 within the housing assembly 20.

The body member 70 has a fluid reservoir 92 containing the hydraulic fluid 48. Cooling fins 94 are coupled to an exterior side 96 of the body member 70 and perform as a heat exchanger by removing heat from the hydraulic fluid 48 and releasing it within the engine compartment 25. The cover member 72 may be fastened to the body member 70 using various methods known in the art. Note, although the fan 16 is shown as being attached to the body member 70 it may be coupled to the cover member 72.

The piston assembly 34 includes a piston housing 100 rigidly coupled to a distribution block 102, which is rigidly coupled to the bracket 26 on a first end 104. The distribution block 102 is coupled to a fan shaft bearing 106 on a second end 108, which allows the fan shaft 44 to rotate about the second end 108. The piston housing 100 has a main pitot tube channel 110, that has a piston branch 112 for flow of the hydraulic fluid 48 to a translating piston 116 and to a hydraulic fluid controller 118. The piston 116 is coupled within a toroidally shaped channel 120 of the housing 100 and has a pressure side 122 and a drive side 124, with a respective pressure pocket 126 and drive pocket 128.

An engaging circuit 36 is also contained within the housing assembly 20 and includes a hydraulic fluid supply circuit 132, a clutch plate assembly 134, a return assembly 136, and a control circuit 138.

The clutch plate assembly 134 includes a clutch pack 156 within a drum housing 158. The clutch pack 156 includes the multiple clutch plates 144 separated into a first series 160, or input clutch plates 160, coupled to the drum housing 158, and a second series 162, or output clutch plates 162, coupled to the fan shaft 44. Of course, any number of clutch plates 144 may be used. The number of clutch plates 144 defining each of the first series 160 and second series 162 may vary from one to several clutch plates, depending upon the desired engagement effect and depending upon space limitations. The control circuit 138 controls operation of the piston 116 and its engagement to the endplate 140.

Also, although a series of clutch plates 144 are utilized to engage the fan 16, other engagement techniques known in the art may be utilized.

The hydraulic circuit 132 applies pressure on the piston 116 to drive the endplate 140, riding on a separation bearing 142 between the endplate 140 and the piston 116, to apply pressure on the input clutch plates 160. The input clutch plates 160 engage the output clutch plates 162, which rotate in response to the degree of engagement (either via friction type engagement or viscous type engagement). The rotating output clutch plates 162 in turn rotate the fan shaft 44 and fan 16 in response. The fan shaft 44 has multiple cooling passageways 164 that extend between a fan shaft chamber 168 and an inner drum chamber 168 allowing passage of fluid 48 therein. Fluid 48 after entering the drum chamber 168 passes across and directly cools the plates 144 and returns to the fluid reservoir 92 through slots 170 in the drum housing 158. The slots 170 may be of various size and shape and have various orientations relative to the center axis 130. The cooling passageways 164 although shown as extending perpendicular to the center axis 130 may extend parallel to the center axis 130, similar to the slots 170.

The hydraulic circuit 132 may include a baffle 146 separating a relatively hot cavity side 148 from a relatively cool cavity side 150 of the fluid reservoir 92 and a pressure pitot tube 152. The pressure tube 152 although shown as being tubular in shape may be of various sizes and shapes. The pressure tube 152 receives hydraulic fluid 48 from within the cool side 150, providing cooling to the engaging circuit 36, due to flow of the fluid 48 from rotation of the housing assembly 20, carrying the fluid 48 in a radial pattern around an inner periphery 154 of the housing assembly 20. The pressure tube 152 is rigidly coupled within the main channel 110 and is therefore stationary. As fluid 48 is circulating about the inner periphery 154, a portion of the fluid 48 enters the pressure tube 152 and applies pressure on the pressure side 122 of the piston 116. Differential speed generated by the fluid 48 through the pressure tube 152 can be expressed according to Bernoulli's equation, shown as equation 1.

$$p_v = \frac{\rho v^2}{2g}$$

In using equation 1 resulting velocity V on the clutch plate assembly 134 is represented in terms of velocity pressure P, density p, and gravity g. Thus, as the rotational speed of the housing assembly 20 increases pressure applied on the clutch assembly 134 also increases providing variable drive speed of the fan 16, as further discussed below. Pressure P within the pressure tube 152 varies proportional with square of velocity V, and since torque of the fan 16 also varies with square of the velocity V, the fan 16 rotates at an approximately proportional constant percentage of input speed or velocity V.

Since the fan 16 has a variable drive speed due to proportional pressure within the pressure tube 152, at low engine speeds, such as during an idle condition, the fan 16 is rotating at a low speed. When the engine 14 is power OFF, there is minimum torque existing in the fan 16, which may be absorbed by the belts 24, unlike that of prior art systems. In a conventional fan clutch system when a fan is rotating or engaged, the fan is typically rotating at a high speed. When an engine is power OFF, torque existing in the conventional fan and fan clutch system is transferred into engine belts, degrading and damaging the belts. Some conventional systems incorporate electronic control devices, such that when an ignition system is powered OFF, the fan clutch system is disengaged before the engine is powered OFF. The additional electronic control devices add complexity and costs. Also, it is generally undesirable to allow an engine to continue running for a time period after an ignition is powered OFF. The present invention eliminates the need for the additional electronic devices and the initial disengagement of a fan clutch system, due to its proportional fan rotating speed design.

The return assembly 136 includes a set of return springs 172 and a spring retainer 174. The springs 172 reside in the fan shaft chamber 166 and are coupled between the fan shaft 44 and the spring retainer 174. The spring retainer 174 has a quarter cross-section that is "L" in shape and is coupled between the drive side 124 and the end plate 140. The springs 172 are in compression and exert force on the piston 116 so as to disengage the clutch plates 144 when fluid pressure on the pressure side 122 is below a predetermined level.

The control circuit 138 includes the distribution block 102, the fluid controller 118, and a main controller 176. The distribution block 102 may have various configurations depending upon the type and style of the fluid controller 118, only one is shown. The distribution block 102 has a return channel 177. The fluid controller 118 may be coupled within a main center channel 178 of the block 102, adjust fluid flow through the return channel 177, may be coupled within the bracket 26, or be external to the block 102 and bracket 26. As shown, the fluid controller 118 adjusts fluid flow through the return channel 177 across the main center channel 178, where after the fluid 48 returns to the reservoir 92. In adjusting fluid 48 flow through the return channel 177, the fluid controller 118 adjusts pressure received by the piston 116. As the fluid controller 118 decreases fluid flow through return channel 177, pressure in the piston branch 112 and on the piston 116 increases.

The fluid controller 118 is used to control the static pressure of fluid 48 contained within the pitot tube 152. The fluid controller 118, according to preferred embodiments of the present invention as described herein, employs a binary control strategy to providing varying pressure relief from the pressure pitot tube 152 that are designed to vary the amount of engagement of wet friction clutch system.

The main controller 176 is electrically coupled to the fluid controller 118 and may be contained within the system 12 or may be separate from the system 12 as shown. The main controller 176 is preferably microprocessor based such as a computer having a central processing unit, memory (RAM and/or ROM), and associated input and output buses. The main controller 176 may be a portion of a central vehicle main control unit, an interactive vehicle dynamics module, a cooling system controller, or may be a stand-alone controller as shown. The main controller 176 generates a cooling signal containing information such as when cooling is desired and the amount of cooling that is desired. The fluid controller 118 in response to the cooling signal adjusts flow of the fluid 48 from the pressure pitot tube 152 to the main channel 178 and back to the fluid reservoir 92.

The main controller 176 may also be used to derate or reduce rotational speed of the engine 14 and reduce traveling velocity of the vehicle 10. Even when cooling is not desired the main controller 176 may activate the fluid controller 118 to increase pressure on the piston 116 and engage the fan 16. Since at least a minimal amount of torque is utilized in operating the fan 16 the rotational speed of the engine 14 may thereby be reduced, everything else being the same.

The cooling circuit 42 includes a second pitot tube or lubrication tube 182. Although, only a single lubrication tube is shown, any number of lubrication tubes may be used, especially in applications where increased flow is desired. The lubrication tube 182 provides high flow rates at low pressures and as with the first tube may be of various size and shape. Fluid 48, from the cool side 150, enters the lubrication tube 182 and is directed into the fan shaft chamber 166 where it then passes through the cooling passageways 164 and cools the clutch pack 156. Fluid 48 may also exit the fan shaft chamber 166 through the slots 170. Fluid exiting from the fan shaft chamber 166 or the drum housing 158 enters the hot side 148, where the cooling fins 94 dissipate heat therefrom into the engine compartment 25. The cooling circuit 42 not only cools and lubricates the clutch pack 156 but also other portions of the engaging circuit 36.

As stated above, the fluid controller 118 of the present invention employs a binary type control strategy to control the amount of static pressure buildup in the pressure pitot tube 152, and hence the amount of engagement of the clutch plates 144 at a given pulley 22 rotational speed ratio used to drive the fan shaft 44 and coupled fan 16. Thus, the clutch pack 156 can be fully engaged (a friction type engagement), partially engaged at two or more relative engagements (via a viscous fluid type engagement), or disengaged.

As one of ordinary skill appreciates, a fully engaged clutch drives the fan 16 at the maximum possible speed based on a given pulley rotational speed, thereby giving maximum cooling effect to the engine 14. Similarly, a disengaged clutch drives the fan 16 at minimal (or no) rotational speed, and represents no significant cooling to the engine 14. Finally, a partially engaged clutch drives the fan 16 at a rotational speed between fully engaged and disengaged, and thus provides less cooling the engine 14 at a given pulley 22 rotational speed than a fully engaged clutch.

Figure 5:
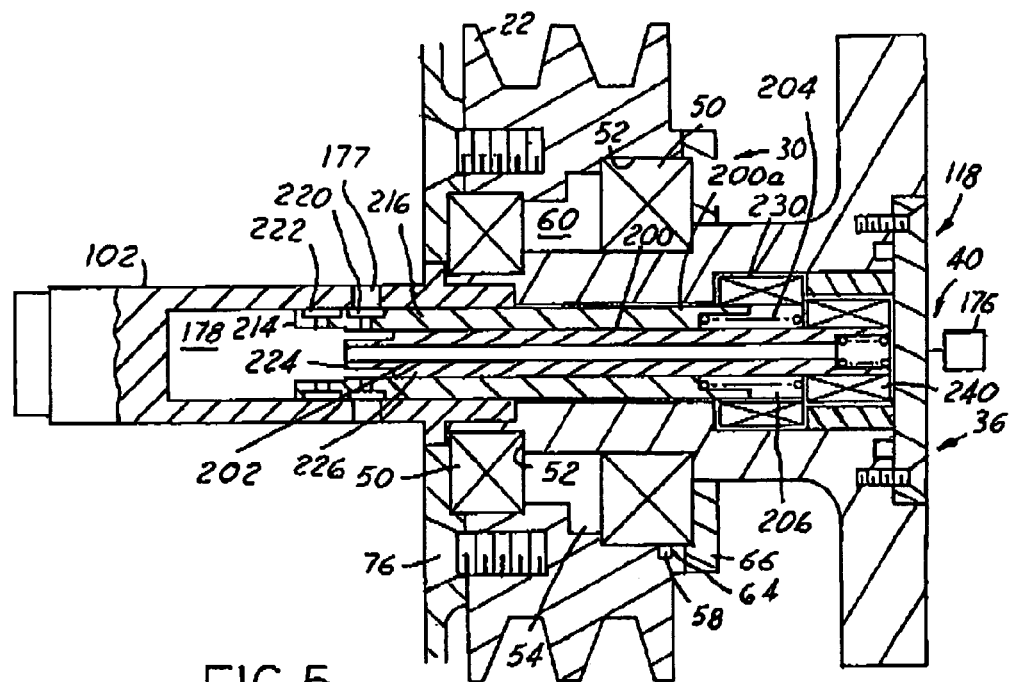
FIG. 5 is a close up view of the fluid controller of FIG. 3 made in accordance with one embodiment of the present invention, where the one of the pair of electronic actuators coupled to the outer spool is in an OFF position and the other one of the pair of electronic actuators coupled to the inner spool is in the ON position.
Figure 6:
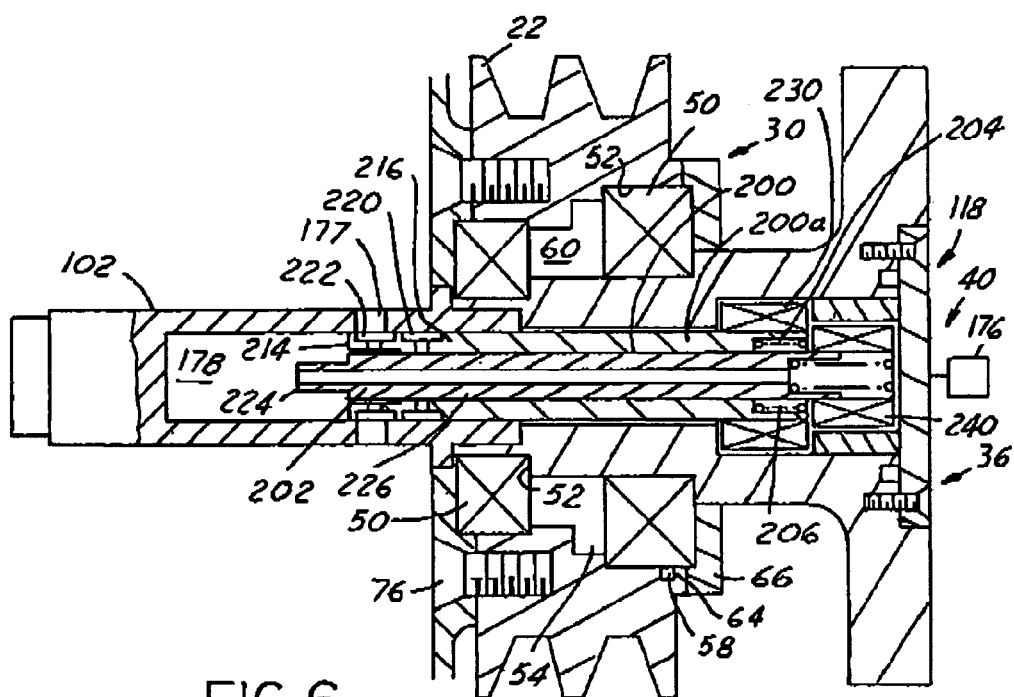
FIG. 6 is a close up view of the fluid controller of FIG. 2 made in accordance with one embodiment of the present invention, where a pair of electronic actuators are both in an ON position.
Figure 7:
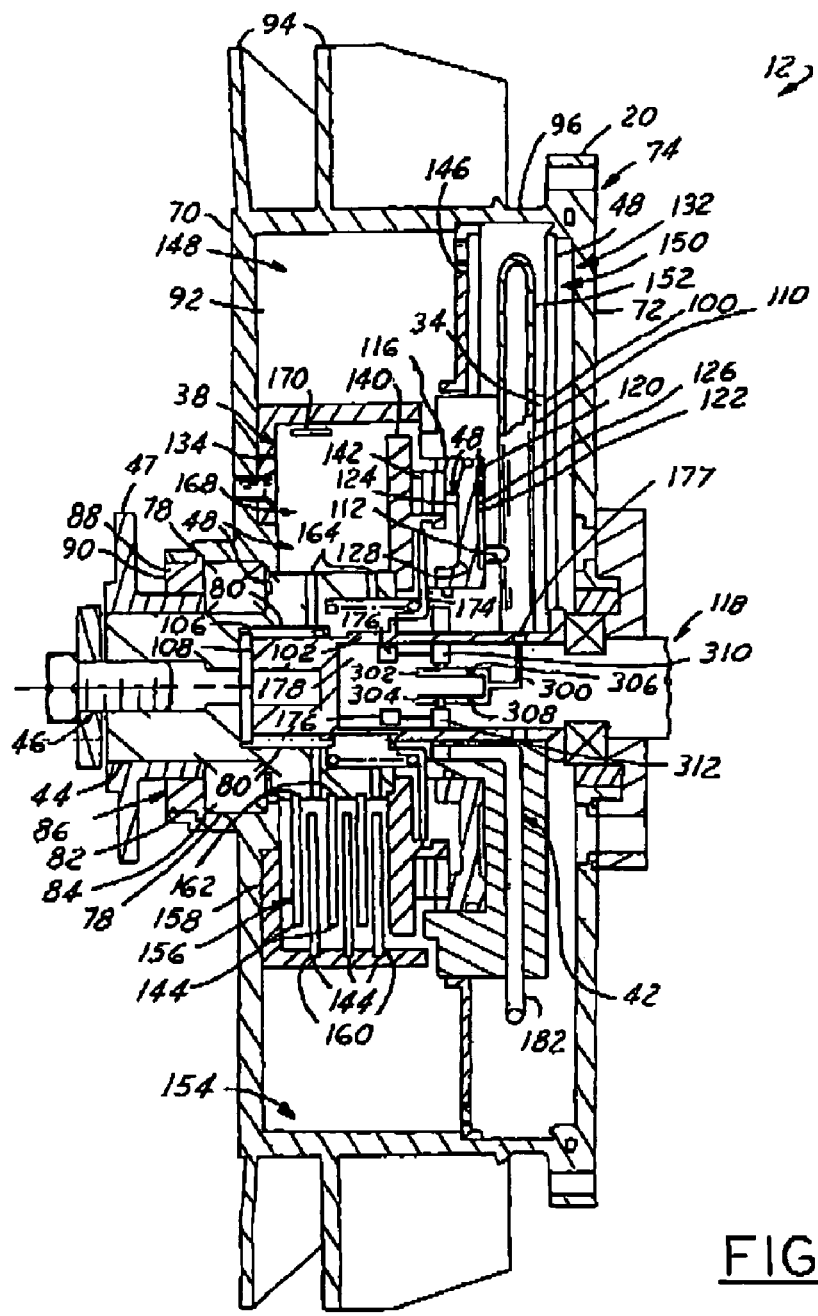
FIG. 7 is a close up view of a hydraulically controlled fan drive system according to another preferred embodiment of the present invention.

Two preferred embodiments of the fluid controller 118 are described below. In one preferred embodiment, as shown in FIGS. 3–6, a binary valving mechanism connected in series controls the flow of hydraulic fluid 48 from the return channel 177 to the main channel 178. In another preferred embodiment, as shown in FIG. 7, a parallel fixed orifice binary control strategy is used to restrict the flow of hydraulic fluid 48 from the return channel 177 to the main channel 178. Each is described below.

In one preferred embodiment, as shown in FIGS. 3–6, the fluid controller 118 consists of an outer spool 200 and an inner spool 202 coupled within a main center channel 178 of the block 102. Each spool 200, 202 is biased in a first position by a pair of springs 204, 206, respectively.

The outer spool 200 has a step region 214 and a body region 216 positioned within the main center channel 178 such that the body region 216 is closely coupled with the spring 204 at a location nearer to the mounting bracket 26. The outer spool 200 also had inner proportionating valve 220 located within the body region 216 and an outer proportionating valve 222 located within the step region 214.

Figure 3:
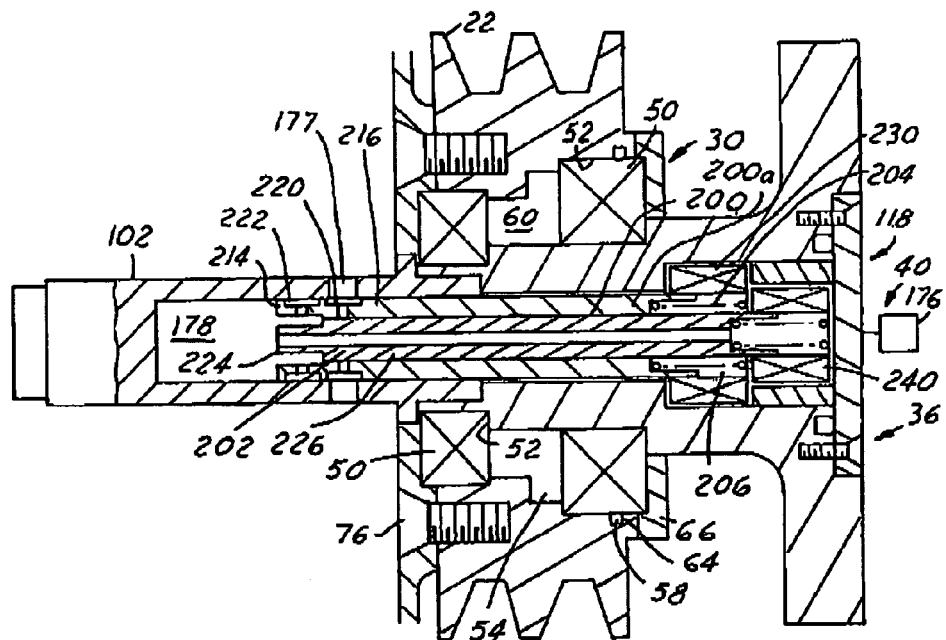
FIG. 3 is a close up view of the fluid controller of FIG. 2 made in accordance with one embodiment of the present invention, where a pair of electronic actuators are both in an OFF position.
Figure 4:
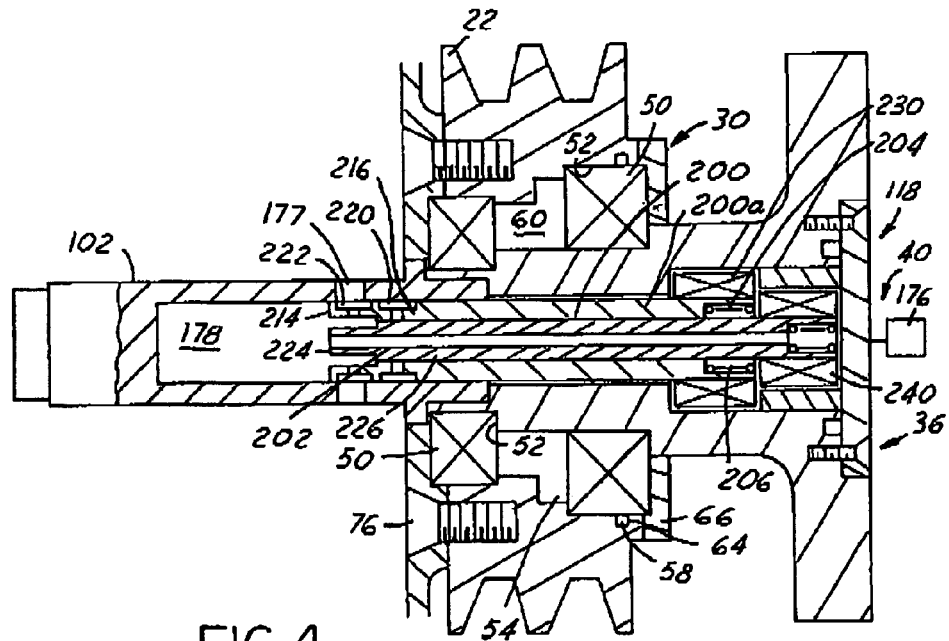
FIG. 4 is a close up view of the fluid controller of FIG. 3 made in accordance with one embodiment of the present invention, where the one of the pair of electronic actuators coupled to the inner spool is in an OFF position and the other one of the pair of electronic actuators coupled to the outer spool is in the ON position.

Also coupled at the spring end 200*a* of the outer spool 200 is an electrical coil 230 that is electrically coupled to the main controller 176. When the electrical coil 230 is unexcited, as shown in FIGS. 3 and 5, the spring 204 maintains the outer spool 200 in a first position, characterized wherein the inner proportionating valve 220 is closely coupled with the return channel 177. When the electrical coil 230 is electrically excited, as shown in FIGS. 4 and 6, the magnetic field created caused the outer spool 200 to move in a direction towards the spring 204 to a second position, characterized wherein the outer proportionating valve 222 is closely coupled with the return channel 177.

The inner spool 202 has a step region 224 and a body region 226 positioned within the main center channel 178 such that the body region 226 is closely coupled with the spring 206 at a location nearer to the mounting bracket 26.

Also coupled at the spring end 202*a* of the inner spool 202 is an electrical coil 240 that is electrically coupled to the main controller 176. When the electrical coil 240 is unexcited, as shown in FIGS. 3 and 4, the spring 204 maintains the inner spool 202 in a first position, characterized wherein the end of the body region 226 is closely coupled with the return channel 177. When the electrical coil 240 is electrically excited, as shown in FIGS. 5 and 6, the magnetic field created causes the inner spool 200 to move in a direction towards the spring 206 to a second position, characterized wherein step region 224 is closely coupled with the return channel 177.

Referring again now to FIG. 3, also known as the engaged position or Default Mode, wherein both electrical coils 230, 240 are unexcited (the OFF/OFF position), hydraulic fluid 48 contained in the pressure pitot tube 152 is allowed to flow through the return channel 177 and into the inner proportioning valve 220. However, the flow of hydraulic fluid 48 is blocked from entering the main center channel 178 by the body region 226 of the inner spool 202. Thus, static pressure of the hydraulic fluid 48 is maintained at a maximum within the pressure pitot tube 152 at the given pulley 22 rotational speed, which in turn maintains the pressure on the piston 116 to provide maximum engagement of the clutch plates 144 (i.e. a friction type clutch drive) to drive the fan shaft 44.

Referring now to FIG. 4, also known as a partially engaged clutch position 1 (or midspeed position 1), wherein electrical coil 230 is excited while electrical coil 240 remains unexcited. In partially engaged clutch position 1, hydraulic fluid 48 is allowed to flow through the return channel 177 and outer proportionating valve 222 and into a gap 270 created between the outer proportionating valve 222 and the body region 226 of the inner spool 202. The hydraulic fluid 48 then flows through the gap 270 to the main center channel 178. As one of ordinary skill appreciates, the size of the gap 270 controls the static pressure release within the pitot tube, which in turn controls the relative positioning of the clutch plates 144. The output is controlled via a traditional viscous drive mechanism, in which the output from the clutch mechanism is controlled by the amount of viscous fluid contained between the clutch plates 144, the distance between the clutch plates 144, and the rotational speed of the pulley 22. In partially engaged clutch position 1, the static pressure on the piston 116 is lessened, therein causing the movement of the input clutch plates 160 to move apart from the output clutch 162. As the rotation of the second series 162, and hence the output to the fan shaft 44 and fan 16, is a function of this spacing, (as well as the amount of viscous fluid 48 contained between the first clutch plates 160 and second series 162 and the rotational speed of the pulley 22, which are both fixed at any given instant), the amount of cooling capability is correspondingly lessened by the distance between the individual clutch plates 144 contained in the first clutch plates 160 and second series 162.

Referring now to FIG. 5, also known as partially engaged clutch position 2 (or midspeed position 2), wherein electrical coil 230 is unexcited while electrical coil 240 is excited. In partially engaged clutch position 2, hydraulic fluid 48 is allowed to flow through the return channel 177 and inner proportionating valve 220 and into a gap 280 created between the inner proportionating valve 220 and the step region 224 of the inner spool 202. The gap 280 is sized larger that the gap 270, thereby allowing more hydraulic fluid 48 to flows through the gap 280 to the main center channel 178 than is possible as shown in FIG. 3. As one of ordinary skill appreciates, the increased gap 280 increases the amount of pressure relief to the pitot tube 152, which in turn reduces the clutch output at a given pulley 22 rotational speed because the clutch plates 144 of the first clutch plates 160 and second series 162 are spaced further apart. Thus, the clutch output rotational speed, and hence fan 16 rotational speed, in partially engaged clutch position 2 is less that the clutch output rotational speed in partially engaged clutch position 1.

Referring now to FIG. 6, also known as a fully disengaged clutch position, wherein electrical coil 230 and 240 are excited. In the fully disengaged clutch position, hydraulic fluid 48 is allowed to flow through the return channel 177 and outer proportionating valve 222 and into the main center channel 178. This allows maximum pressure relief within the pitot tube 152, thereby disengaging the clutch output by moving the clutch plates 144 sufficiently apart so as to produce little, if any, viscous drive output response. Thus, coupled output to the fan shaft 44 and fans 16, and hence cooling response to the engine 14, is minimized.

As FIGS. 3–6 describe, a hydraulically fan drive system 12 is shown in which there are four possible clutch outputs at a given pulley 22 rotational speed used to rotate the fan shaft 44 and fans 16. This allows more precise control of the cooling capabilities of the fan 16 at a given engine speed. Each possible scenario as disclosed in FIGS. 3–6 is controlled by the main controller 176, which directs the electrical excitation of the coils 230, 240 base on a fan 16 speed used to cool the engine 14 based on numerous desired engine operating conditions described above.

While the present invention as described in FIGS. 3–6 shows two spools and four possible clutch outputs at a given pulley rotational speed, those of ordinary skill in the art would quickly recognize that additional partially engaged clutch positions could be readily incorporated into the design.

For example, additional partially engaged clutch positions could be accomplished by the addition of additional electronically controlled spools within the interior of the main center channel 178. Thus, by controlling which inner spools are activate, a multitude of potential gap sizes can be created between the proportionating valves 220, 222 and the body or stepped regions of the inner spools to more precisely control the release of static pressure from the pitot tube 152 through the channel 177 and to the main center channel 178 and reservoir 98.

Further, additional partially engaged clutch positions could be achieved by adding additional stepped regions, each having a proportionating valve, to the outer spool 200 and allowing a midrange electrical excitation of the coil 230 by the main controller 176. This would create an additional two midrange clutch engagements per additional step region to achieve further output control.

Similarly, additional stepped regions may be added to the inner spool 202. By allowing midrange electrical excitation of the coil 240, additional gap sizes, and hence midrange speed positions for the fan 16 created by partially engaging the clutch pack 156 (i.e. a viscous fluid type drive mechanism), may be created between the respective proportionating valve 200, 202 and respective stepped region.

In an alternative embodiment, as described in FIG. 7, controlled static pressure flow from the return channel 177 to the main center channel 178 through the fluid controller 118 is achieved forming the fluid controller 118 to include a pair of parallel restricted flow channels each being capable of being opened or closed electronically to produce various midrange clutch options similar to those described above in FIGS. 3–6.

In FIG. 7, the fluid controller 118 consist of a pair of parallel flow channels 302, 304 fluidically coupled to a main flow channel 300, which is also fluidically coupled to the return channel 177.

Also coupled within each flow channel 302, 304 is an electronically controlled valve 310, 312. Each valve 310, 312 is controlled by the main controller 176 between an open position, which allows fluid flow from the return channel to the main channel 178, and a closed position, which does not allow fluid flow from the return channel 177 to the main channel 178. FIG. 8 shows both valves 310, 312 in the open position, of Disengaged clutch position.

The flow of hydraulic fluid 48 through the flow channels 302, 304 can be restricted when the valves 310, 312 are in one of two preferred methods. First, the orifice size of each flow channel may be sized differently to accommodate a different flow 48 rate. For example, the orifice size of the flow channel 302 is greater than that of flow channel 304.

Alternatively, as shown in FIG. 7, the flow channels 302, 304 could have equal size orifices, and one or both of the flow channels 302, 304 may preferably have a restrictor 306, 308 coupled within a portion of the respective channel that restricts the volume of fluid flow. The size of restrictor 306 is sized larger (therein creating a smaller orifice through which fluid 48 can flow) than that of restrictor 308 to restrict fluid 48 flow through the flow channel 304 as compared with flow channel 302.

At a given pulley 22 rotational speed, depending upon the desired fan 16 rotational speed, the main controller 176 can direct the closing or opening of either valve 310, 312. This creates four potential operating conditions, including an Engaged clutch position, a partially engaged clutch position 1, a partially engaged clutch position 2, and a disengaged clutch position. Each is described below.

In the disengaged clutch position, the controller 176 directs the valves 310, 312 open. This allows flow of fluid 48 from the pitot tube 152, through the return channel 177 and the main flow channel 300, and through both flow channels 302, 304. This allows maximum pressure relief within the pitot tube 152, thereby disengaging the clutch output by moving the clutch plates 144 sufficiently apart so as to produce little, if any, viscous type drive output response. Thus, coupled output to the fan shaft 44 and fans 16, and hence cooling response to the engine 14, is therefore minimized.

In partially engaged clutch position 2, the main controller 176 directs valve 310 closed and maintains valve 312 in the open position. This allows fluid 48 flow through flow channel 304 only. As the relief of fluid 48 is restricted as compared with the disengaged clutch position, this in turn decreases the amount of pressure relief to the pitot tube 152, which in turn increases the clutch output at a given pulley 22 rotational speed because the clutch plates 144 of the first clutch plates 160 and second series 162 are spaced closer together than in the disengaged clutch position. Thus, the clutch output rotational speed (i.e. fan 16 rotational speed) in partially engaged clutch position 2 is greater than in the disengaged clutch position.

In partially engaged clutch position 1, the main controller 176 directs valve 312 closed and maintains valve 310 in the open position. This allows flow of fluid 48 through flow channel 302 only. As the flow of fluid 48 from the pitot tube 152 to the main channel 178 is restricted as compared with the disengaged clutch position, this in turn decreases the amount of pressure relief to the pitot tube 152 as compared to the disengaged clutch position, which in turn increases the clutch pack 156 output at a given pulley 22 rotational speed because the clutch plates 144 of the first clutch plates 160 and second series 162 are spaced closer together than in the disengaged clutch position. Further, because the orifice size of flow channel 302 is smaller than that of flow channel 304 (either due to the restricted diameter of the flow channel 302 or through the use of the larger restrictor 306), less static pressure may be relieved form the pitot tube 152 in partially engaged clutch position 1 than in partially engaged clutch position 2. Thus, the clutch output rotational speed (in terms of fan 16 speed) in partially engaged clutch position 1 is greater than the clutch output rotational speed in partially engaged clutch position 2.

In the engaged clutch position, the valves 310, 312 are maintained in a closed position (this is the default position), thus preventing flow of hydraulic fluid 48 from the pitot tube 152, thereby maintaining static pressure within the pitot tube 152 at a maximum level achievable at the current pulley rotational speed and ratio. This in turn provides maximum engagement of the clutch plates 144 (i.e. friction type clutch drive) to drive the fan shaft 44 and fan 16, therein providing maximum cooling to the engine 14. As described above, the engaged clutch position is the default position, ensuring that the fan will rotate to maintain the engine 14 at cool temperatures even if the main controller 176 is disabled.

Figure 2:
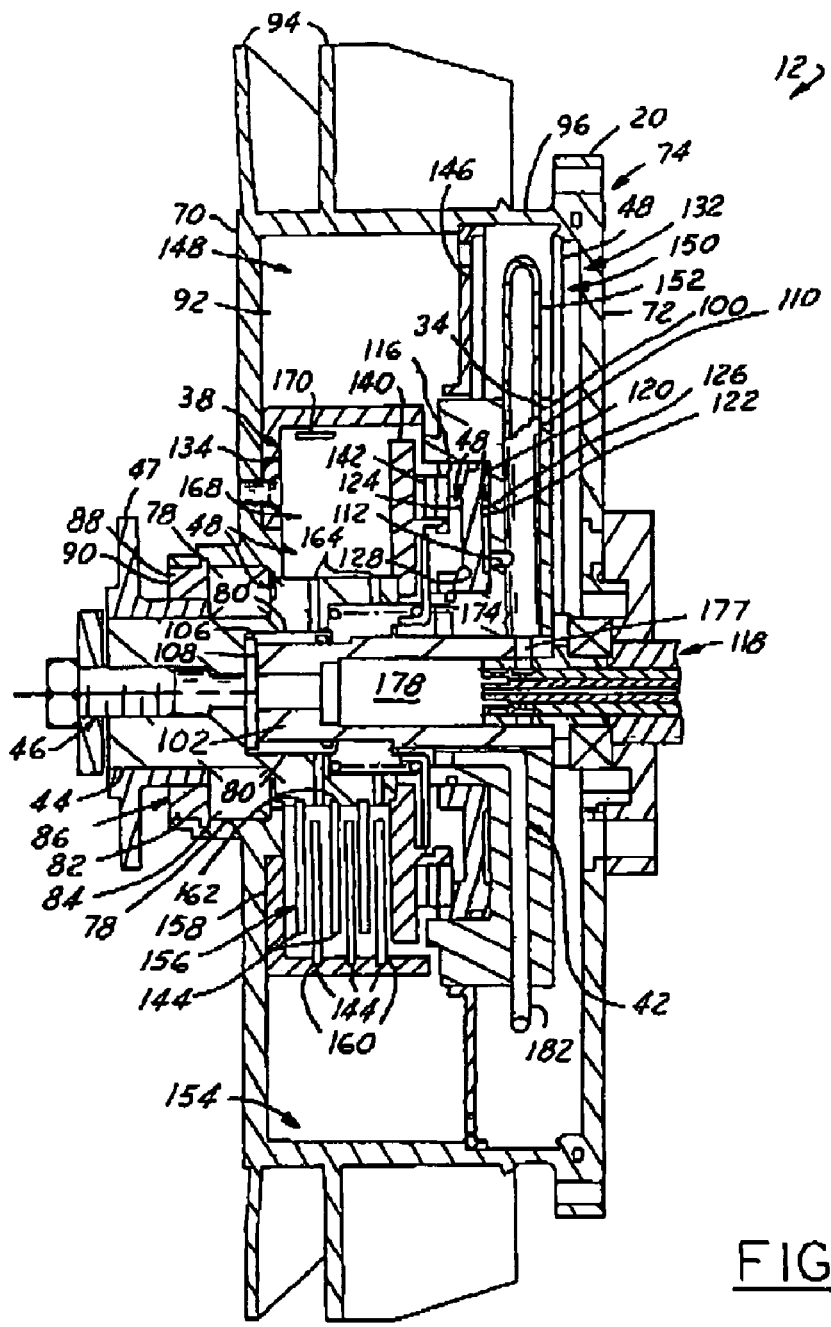
FIG. 2 is a cross-sectional view of the hydraulically controlled fan drive system in accordance with an embodiment of the present invention.

The hydraulically fan drive system 12 as shown in FIGS. 1, 2 and 7 is shown in which there are four possible clutch outputs at a given pulley 22 rotational speed used to rotate the fan shaft 44 and fans 16. This allows more precise control of the cooling capabilities of the fan 16 at a given engine speed. Each possible scenario as disclosed in FIG. 8 is controlled by the main controller 176, which directs the opening and closing of valves 310, 312 to provide the desired fan 16 rotational rate at a given pulley 22 rotational speed and ratio based on numerous desired engine operating conditions described above.

While the present invention as described in FIG. 7 shows two channels and two valves, those of ordinary skill in the art would quickly recognize that additional partially engaged clutch positions could be readily incorporated into the design by introducing more flow channel each having an additional valve.

The present invention provides a robust hydraulically drive fan drive system that can be used in a wide variety fan clutch applications that is capable of controlling the static pressures within the pitot tubes used to engage, partially engage, or disengage the clutch mechanism at any given pulley speed and pulley ratio, thereby creating a so-called mid level speed control that allows more precise cooling capabilities at any given engine speed. This in turn maximizes engine performance in terms of fuel economy and emissions, for example.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A hydraulically controlled fan drive system for an engine comprising:
    a housing assembly containing a hydraulic fluid within a fluid reservoir;
    an input circuit capable of rotating said housing assembly at a given rotational speed;
    a clutch plate assembly contained within said housing assembly;
    a fan shaft coupled to said clutch plate assembly;
    a fan coupled to said fan shaft;
    a pitot tube coupled within said housing assembly and receiving at least a portion of said hydraulic fluid from said fluid reservoir at said given rotational speed, wherein said portion of hydraulic fluid defines a static pressure within said pitot tube at said given rotational speed;
    a piston fluidically coupled with said pitot tube, said piston capable of moving towards and engaging said clutch plate assembly as a function of said static pressure, wherein the engagement of said clutch assembly causes said fan shaft and said fan to rotate in response; and
    a fluid controller fluidically coupled between said pitot tube and said fluid reservoir, said fluid controller using a binary control strategy to control an amount of an engagement of said clutch plate assembly between a fully engaged clutch position, at least two partially engaged clutch positions, and a disengaged clutch position;
    wherein said amount of said engagement controls the rotational speed of said fan used to maintain the engine at a desired operating temperature as a function of said given rotational speed.

2. The fan drive system of claim 1, wherein said fluid controller comprises:
    a spring loaded outer spool coupled within a main center channel of said housing assembly, said outer spool having a inner proportionating valve coupled within an outer spool body region and an outer proportionating valve coupled within an outer spool stepped region;
    a spring loaded inner spool coupled within said outer spool, said inner spool having an inner spool body region and an inner spool stepped region;
    a first electrical coil coupled to said outer spool;
    a second electrical coil coupled to said inner spool; and
    a main controller coupled to said first electrical coil and coupled to said second electrical coil, said main controller capable of directing a first electrical charge through said first electrical coil and also capable of directing a second electrical charge through said second electrical coil as a function of said desired engine operating temperature at said given rotational speed;
    wherein the electrical excitation of said first electrical coil causes said outer spool to move from a first position to a second position;
    wherein the electrical excitation of said second electrical coil causes said inner spool to move from a third position to a fourth position.

3. The fan drive system of claim 2, wherein said first position is defined such that said inner proportionating valve is fluidically coupled said pitot tube through a return valve.

4. The fan drive system of claim 3, wherein said second position is defined such said outer proportionating valve is fluidically coupled with said pitot tube through a return valve.

5. The fan drive system of claim 4, wherein said third position is defined such that said inner spool body region is closely coupled to said pitot tube through a return valve.

6. The fan drive system of claim 5, wherein said fourth position is defined such that said inner spool stepped region is closely coupled to said pitot tube through a return valve.

7. The fan drive of claim 6, wherein said engaged clutch position is defined such that said outer spool is in said first position and such that said inner spool is in said third position.

8. The fan drive of claim 6, wherein said disengaged clutch position is defined such that said outer spool is in said second position and such that said inner spool is in said fourth position.

9. The fan drive of claim 6, wherein a first partially engaged clutch position of said at least two partially engaged clutch positions is defined such that said outer spool is in said second position and such that said inner spool is in said third position.

10. The fan drive of claim 9, wherein a second partially engaged clutch position of said at least two partially engaged clutch positions is defined such that said outer spool is in said first position and such that said inner spool is in said fourth position.

11. The fan drive of claim 10, wherein said second partially engaged clutch position allows less rotation of said fan at said given rotational speed than said first partially engaged clutch position.

12. The fan drive of claim 1, wherein said fluid controller comprises:
    a main flow channel fluidically coupled to said pitot tube through a return valve;
    a first flow channel fluidically coupled to said main flow channel and to said fluid reservoir;

a second flow channel fluidically coupled to said main flow channel and to said fluid reservoir;

a first valve coupled to said first flow channel, said first valve capable of movement from a first open position to a first closed position, wherein said first open position allows a flow of said portion of said hydraulic fluid from said pitot tube through said main flow channel and said first flow channel to said fluid reservoir and wherein said first closed position prevents the flow of said hydraulic fluid through said second flow channel;

a second valve coupled to said second flow channel, said second valve capable of movement from a second open position to a second closed position, wherein said second open position allows a flow of said portion of said hydraulic fluid from said pitot tube through said main flow channel and said second flow channel to said fluid reservoir and wherein said second closed position prevents the flow of said hydraulic fluid through said second flow channel; and a main controller electrically coupled to said first valve and said second valve, said main controller capable of electrically actuating said first valve from said first closed position to said first open position; said main controller also capable of electrically actuating said second valve from said second closed position to said first closed position.

13. The fan drive system of claim 12, wherein said engaged clutch position is defined wherein said first valve is in said first closed position and wherein said second valve is said second closed position.

14. The fan drive system of claim 12, wherein said disengaged clutch position is defined wherein said first valve is in said first open position and wherein said second valve is said second open position.

15. The fan drive system of claim 12, wherein a first partially engaged clutch position of said at least two partially engaged clutch positions is defined wherein said first valve is in said first open position and said second valve is in said second closed position.

16. The fan drive system of claim 15, wherein a second partially engaged clutch position of said at least two partially engaged clutch positions is defined wherein said first valve is in said first closed position and said second valve is in said second open position.

17. The fan drive system of claim 16, wherein said second partially engaged clutch position allows less rotation of said fan at said given rotational speed than said first partially engaged clutch position.

18. The fan drive system of claim 12, wherein said fluid controller further comprises a first restrictor coupled within said first main channel.

19. The fan drive system of claim 18, wherein said fluid controller further comprises a second restrictor coupled within said second main channel, wherein said second restrictor allows less rotation of said fan at said given rotational speed than said first restrictor.

20. A method for controlling the engagement of a clutch pack used to drive a fan in a hydraulically controlled fan drive system to maintain an engine at an ideal operating temperature at a given pulley rotational speed, the fan system having an engagement circuit coupled to the pulley and driven by static pressure with a pitot tube at the given rotational speed, the method comprising:

coupling a fluid controller between the pitot tube and a fluid reservoir, said fluid controller having a fully engaged clutch position, a fully disengaged clutch position, and at least two partially engaged clutch positions;

electrically coupling a main controller to said fluid controller, said main controller capable of controlling the temperature of the engine at the given pulley rotational speed; and directing an electrical signal form said main controller to said fluid controller as a function of the engine temperature at the given pulley rotational speed, wherein said fluid controller interprets said electrical signal to move from a first position to a second position;

wherein said first position selected from the group consisting of said fully engaged clutch position, said fully disengaged clutch position, and said at least two partially engaged clutch positions and wherein said second position selected from the group consisting of said fully engaged clutch position, said fully disengaged clutch position, and said at least two partially engaged clutch positions.

21. The method of claim 20, wherein said fully engaged clutch position is such that the fan rotates at a maximum rotational speed and wherein said disengaged is such that the fan rotates at a minimum rotational speed at the given pulley rotational speed.

22. The method of claim 21, wherein one of said at least two partially engaged clutch positions is such that the fan rotates at a first speed and wherein another of said at least two partially engaged clutch position in such that the fan rotates at a second speed, wherein said second speed is greater than said first speed and wherein said first speed and said second speed rotate at a speed between said minimum speed and said maximum speed of the fan at the given pulley rotational speed.

* * * * *